INVENTORS
JAMES H. COULTER, JR.
& FRANK E. HUTTON
BY
J.P.Moran
ATTORNEY

May 8, 1956    J. H. COULTER, JR., ET AL    2,744,812
COMBINATION OF A FURNACE FOR THE INCINERATION OF
RESIDUAL LIQUOR WITH MEANS FOR DISINTEGRATING
SOLIDS ENTRAINED IN SAID LIQUOR
Filed Dec. 1, 1949    2 Sheets-Sheet 2
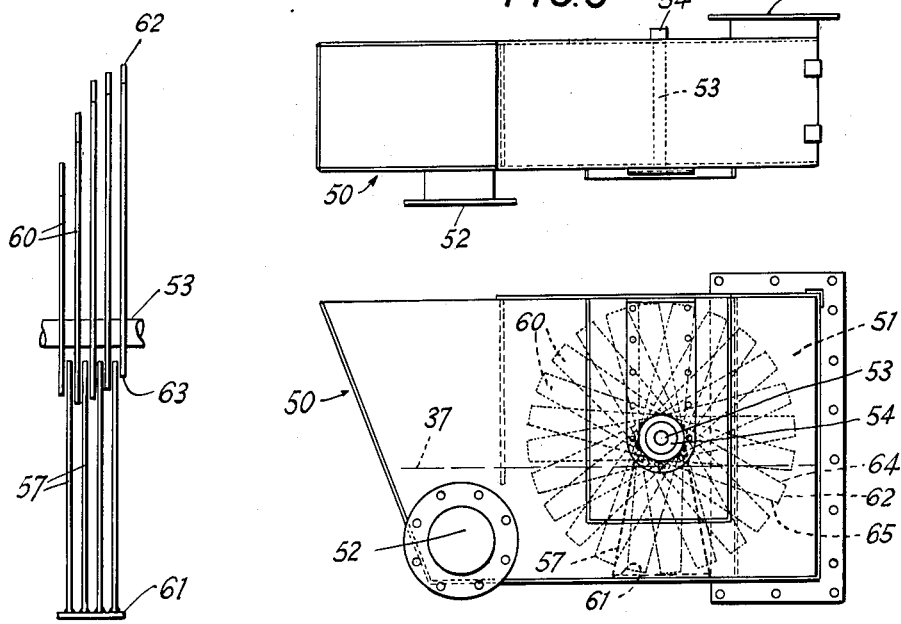
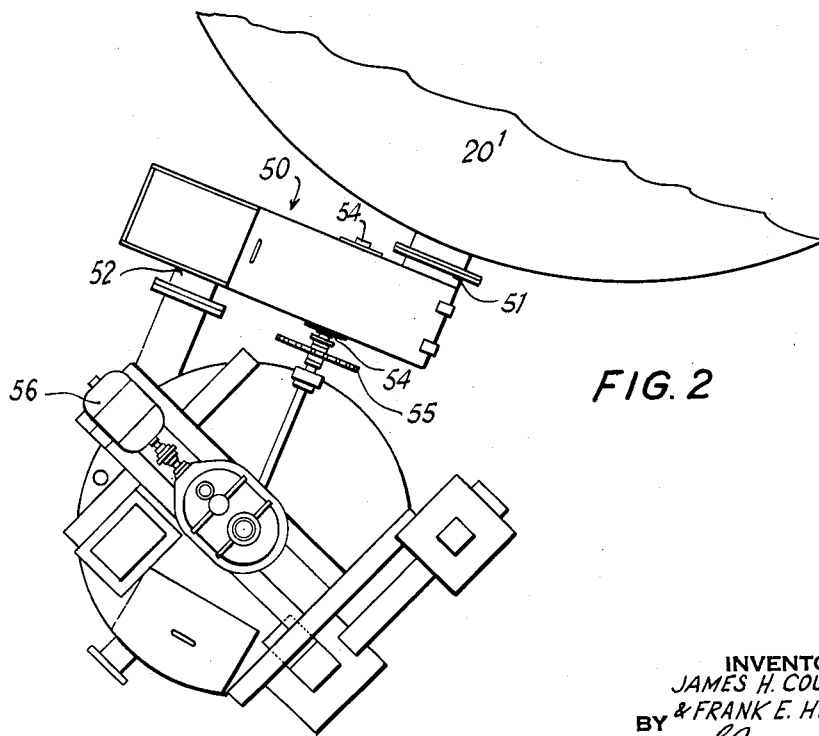
INVENTORS
JAMES H. COULTER, JR.
BY & FRANK E. HUTTON
ATTORNEY

# United States Patent Office 2,744,812
Patented May 8, 1956

2,744,812

COMBINATION OF A FURNACE FOR THE INCINERATION OF RESIDUAL LIQUOR WITH MEANS FOR DISINTEGRATING SOLIDS ENTRAINED IN SAID LIQUOR

James H. Coulter, Jr., Franklin Square, N. Y., and Frank E. Hutton, Wyckoff, N. J., assignors to The Babcock & Wilcox Company, Rockleigh, N. J., a corporation of New Jersey Application December 1, 1949, Serial No. 130,452

1 Claim. (Cl. 23—262)

The present invention relates to apparatus for the size reduction of solids entrained in a flowing stream of liquid, and more particularly to a mechanical device arranged to crush or disintegrate lumps of solid materials present in a stream of pulp residual liquor prior to the spray incineration of the liquor in a chemical recovery furnace.

In the recovery of chemicals from a wood pulping process, residual liquor containing inorganic chemicals and combustible organic matter, such as, for example, the black liquor of the Kraft or sulfate process of manufacturing paper pulp, is concentrated to a solid content of 40–70% and its combustible constituents burned in a furnace to recover the included inorganic chemicals and to generate heat for absorption in an associated heat exchange apparatus. Ordinarily, the residual liquor obtained from the pulp washers is partially concentrated in multiple effect evaporators, while final liquor concentration is obtained by direct contact between the partially concentrated liquor and the gaseous products of combustion resulting from the incineration of concentrated liquor. The concentrated liquor is thereafter delivered to a mixing tank where make-up chemicals, for example salt cake, may be added and the liquor pumped to the furnace for spray incineration.

The great majority of modern chemical recovery furnaces used in wood pulping processes are arranged for spray incineration of the residual liquor, in for example, the general type of furnace shown in U. S. Patent 2,161,110. In such systems, the concentrated liquor is delivered to one or more oscillating nozzles positioned in a wall of the furnace and arranged to project the liquor into the furnace in the form of a spray.

While the finally concentrated residual liquor delivered to the furnace spray nozzle must contain 40% or more of solids so that the combustion thereof will be self-sustaining, the individual particles of solids must be small enough to avoid pluggage of the spray nozzle orifice or the connecting piping. The direct contact evaporative concentration of the liquor may be a source of the formation of lumps of solid material. Some of these lumps are ordinarily dissolved in the mixing tank, with or without the dissolving assistance of steam jets. Nevertheless, lumps will sometimes pass with the concentrated liquor into the nozzle and its connecting piping, resulting in pluggage and operational interruptions.

Heretofore various forms of screens have been used to remove oversized lumps, but such expedients have been unsatisfactory and wasteful of chemicals and labor. Some plants have also found it necessary to crush the make-up chemicals before addition to the liquor, to prevent nozzle pluggage from this source.

In accordance with the present invention a mechanical means is interposed in the liquor stream to crush or disintegrate any oversized lumps of solids present in the liquor. As hereinafter described, the apparatus for this purpose comprises a plurality of stationary fingers or plates arranged in spaced parallel relationship in a row extending transversely across the liquor flow passageway. A plurality of rotating fingers or blades are mounted for rotation upon a shaft and arranged for each of the rotating blades to pass through a corresponding opening between spaced stationary plates during each rotation of the shaft. All of the liquor delivered to the furnace spray nozzle passes through the disintegrator, so that the maximum size of the suspended solids in the liquor is effectively limited.

The various features of novelty which characterize our invention are pointed out with particularity in the claim annexed to and forming a part of this specification. For a better understanding of the invention, its operating advantages and specific objects attained by its use, reference should be had to the accompanying drawings and descriptive matter in which a practical embodiment of the invention has been illustrated and described.

Of the drawings:

Fig. 2 is a plan view of a portion of the residual liquor flow path in a chemical recovery unit including the crusher of the present invention; and Figs. 3, 4 and 5 are plan, elevation and end views, respectively, partially in section, of a portion of the apparatus shown in Figs. 1 and 2.

Figure 1:
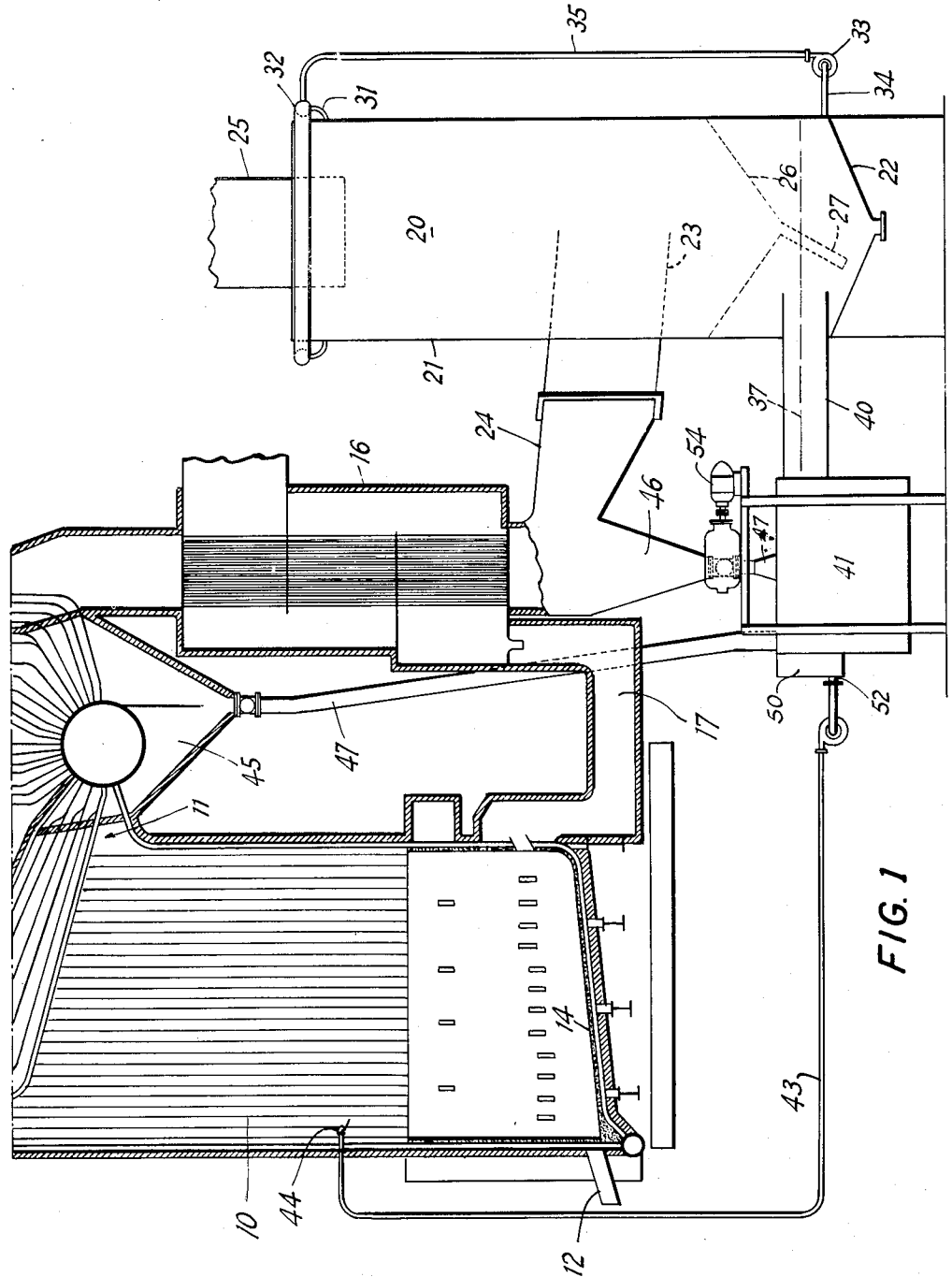
Fig. 1 is a partially diagrammatic elevation view of a chemical recovery unit incorporating the present invention.

In general, as shown in Fig. 1, a typical furnace 10 for the incineration of residual liquor is associated with a vapor generator 11 for the recovery of the high level sensible heat in the gases of combustion. A major portion of the inorganic chemicals contained in the residual liquor is recovered during the incineration of the liquor in the form of a chemical smelt which is discharged through a spout 12 at the lower end of an inclined hearth 14 on the furnace bottom. From the spout the smelt falls into a dissolving tank from which it is pumped to the usual causticizing plant (not shown) and prepared for reuse in the pulping process.

After the gases produced in the furnace 10 have given up a major portion of their heat in the vapor generator, the gases are passed through a tubular type air heater 16, and thence through a direct contact type of liquor concentrating device. In the air heater the gases heat combustion air by indirect contact heat exchange therewith, with the heated air passing through a duct system 17 for controlled admission into the furnace. Part of the remaining sensible heat in the gases is utilized in a direct contact evaporator to concentrate residual liquor prior to its incineration. In some installations the flue gases leaving the vapor generator pass directly to a direct contact liquor evaporator, and the combustion air is preheated by other means, such as a steam-coil heater.

Any of the well known types of direct contact evaporators can be used. However, as shown in Fig. 1, the evaporator 20 is of the cyclone type disclosed and claimed in a co-pending application of Tomlinson et al., Serial No. 780,090, filed October 15, 1947. The shell 21 of the evaporator is cylindrical with an inverted frusto-conical bottom 22, and is provided with a tangential gas inlet 23 located intermediate its vertical height and in communication with the air heater 16 through the duct 24. Residual liquor which has been partially concentrated in a battery of multiple effect evaporators (not shown) is sprayed into the tangential gas inlet 23 to intimately mix with the entering relatively hot gases. The gases, with entrained liquor spray, pass upwardly along the wall of the evaporator shell 21 in a helical flow path toward an axially arranged outlet duct 25. With the interior surface of the shell 21 wetted with a downwardly moving film of recirculated liquor, liquor droplets and entrained solids separated from the gas stream by centrifugal force join the film of liquor on the interior surface of the shell and flow toward the bottom of the evaporator. The concentrated liquor is collected in an inverted frusto-conical basin 26 spaced above the evaporator bottom and is discharged through a pipe 27 into a pool of liquor maintained within the lower portion of the shell 21.

The "wetted wall" effect of the film of liquor flowing downwardly on the inner surface of the evaporator shell is obtained by a plurality of nozzles arranged to spray liquor tangentially against the upper portion of the internal surface of the shell. The nozzles receive recirculated liquor through pipes 31 from an annular manifold 32 encircling the upper end of the shell 21. A pump 33 withdraws concentrated liquor from the pool maintained in the bottom of the evaporator through a pipe 34 and discharges liquor through a pipe 35 into the manifold 32. The gases leaving the evaporator change their direction of flow to pass through the axially positioned duct 25, and thence through an induced draft fan.

The pool of liquor in the bottom portion of the evaporator is maintained at a selected level, such as at 37, by regulation of the amount of partially concentrated or make-up liquor sprayed into the inlet duct 24. A conduit 40 of rectangular cross-section connects the liquor pool in the bottom portion of the evaporator with a mixing tank 41. The tank 41 is cylindrical and is provided with a motor driven agitator to maintain the concentrated liquor therein in a flowable condition and to avoid separation of solids from the liquid. From the mixing tank, the liquid is pumped through a pipe 43 to the spray nozzle 44 in the furnace wall in accordance with liquor furnace requirements. Any make-up chemical, such as salt cake or the like, is added to the liquor in the mixing tank 41. In most installations, some of the dust entrained with the gases leaving the furnace 10 is collected at the lower end portions of the gas passes within the vapor generator 11 and at the lower end of the air heater 16. In Fig. 1, dust hoppers 45 and 46 collect any dust deposited in the lower portions of the generator and air heater respectively. Since the collected dust contains a high percentage of valuable chemicals, each hopper is provided with a valved discharge spout 47 or other spout connected with the mixing tank 41, so that the dust may be returned to the furnace with the liquor for smelting and subsequent recovery.

Ordinarily, the solids in the concentrated liquor obtained from the cyclone evaporator 20 are well dispersed in the liquor and are not lumpy. However, under unusual evaporator operating conditions, such as during an interruption in the supply of partially concentrated liquor to the evaporator, lumps of solids may be formed, to accumulate in the concentrated liquor delivered to the mixing tank 41 and pumped to the furnace spray nozzle. Other types of direct contact evaporators are also apt to cause the formation of solid lumps in the concentrated liquor delivered to the mixing tank. The recovered dust from the hoppers 45 and 46, which is added to the liquor in the mixing tank, is usually in a finely divided form, but may also tend to form lumps in the mixing tank. Many types and forms of chemical compounds may be used as a source of the chemical make-up added to the liquor in the mixing tank. However, the most commonly used source of chemical is salt cake, which is purchased in lump form. Many plants provide a salt cake crusher adjacent the mixing tank so that the material can be suitably reduced in size before its addition to the liquor. Such separate salt cake crushers can be eliminated by the use of the disintegrator or crusher of the present invention when the crusher is positioned in the flow path of concentrated liquor between the mixing tank 41 and the furnace spray nozzle 44, as shown in Fig. 1. Alternately, if desired, the crusher of the present invention may be positioned in the concentrated liquor flow path upstream from the mixing tank 41, as shown in Fig. 2.

As shown in the drawings, the crusher of the present invention is installed in a flow box 50 which is inserted in the flow path of the concentrated liquor passing to the furnace spray nozzle 44. Advantageously the flow box, the conduit 40 and the mixing tank 41 are so arranged that the normal liquor level maintained in the lower portion of the cyclone evaporator 20 forms a corresponding continuous level in the related equipment. The cross-sectional dimensions of the conduit and the flow box are selected to maintain a flow rate therethrough, under conditions of rated liquor supply rate to the furnace 10, such that the majority of solids will remain in suspension in the liquor. As shown particularly in Figs. 3 and 4, the flow box 50 is rectangular in both plan and vertical section, and is provided with liquor inlet 51 and outlet 52 openings on opposite sides thereof, adjacent its opposite ends. Between the liquor inlet and outlet openings of the flow box 50, a horizontally disposed shaft 53 is mounted for rotation in bearings 54 supported by the side walls of the flow box. The shaft 53 is positioned above the normal operating level of liquor 37, with its axis of rotation normal to the direction of liquor flow through the flow box. The bearings 54 are attached to reinforcing and stiffening plates bolted to the side walls of the box 50, with one end of the shaft ending in its bearing, while the opposite end of the shaft extends beyond the bearing to engage a driving wheel 55. Both bearings are provided with suitable packing to form a fluid seal. The driving wheel and the shaft are rotationally driven at a suitable speed through a chain or belt from a suitable driving motor. Advantageously the source of power is obtained from the motor 56 operating the agitator of the mixing tank. Such a drive connection is shown schematically in Figs. 1 and 2.

The crushing or disintegrating force used in breaking up the solids in the liquor is applied between a plurality of spaced stationary plates 57, mounted on the bottom of the flow box, and a plurality of revolving blades 60, mounted on the shaft 53. The stationary plates 57 are fabricated from plate stock in the form of isosceles trapezoids. The plates are welded at their bases to a base plate 61 in parallel spaced relationship so that when the base plate is bolted to the bottom of the flow box the plates 57 are parallel to the direction of liquor flow and an extension of their centerlines would intersect the axis of rotation of the shaft 53. When, for example, the plates 57 are cut from ¼ inch steel plate the spacing therebetween, in their installed position, is approximately ⁵⁄₁₆ inch. The outermost plates 57 are welded to the side walls of the flow box 50 so as to protect those walls and are also positioned to maintain the spacing and parallel relationship of all of the plates.

The revolving blades 60 are likewise formed from plate stock which would be ³⁄₁₆ of an inch in thickness, when utilized in combination with the thickness and spacing of the plates 57 hereinbefore given as an example of the apparatus described. The blades are cut uniformly in the shape of a right trapezoid with the parallel ends of each shape forming the tip 62 and the base 63 of the blade. The large end of each blade is drilled to fit over the shaft 53, with the drilled hole centered on a centerline drawn from the corner of the tip 62 parallel to the trailing edge 64 of the shape. The trailing edge 64 of the blade shape is at right angles to the tip 62 and the base 63, while the leading or cutting edge 65 of the blade is inclined at an angle of approximately 10 degrees from the trailing edge.

As shown in the drawings, the blades 60 are secured to the shaft 53 and spaced therealong in parallel relationship to pass between the spaced plates 57 during rotation of the shaft. The blades are angularly spaced circumferentially of the shaft so that one or more of the blades are passing between the plates throughout each complete revolution of the shaft. With this arrangement, the power required to rotate the shaft will tend to be generally uniform, except when the blades are crushing solids against the plates. It will be noted that the angle between each blade edge 65 and the upstream edges of the adjacent plates 57 will tend to shear solids caught therebetween during the rotation of the shaft. Any unusually hard solids will tend to be forced downwardly toward the bottom of the flow box while in engagement between blade and plate with substantially all of the crushing or shearing force exerted by the unit concentrated in a small area represented by a pair of plate ends and the edge of one blade. Such a concentration of forces will cut or disintegrate any solids usually encountered in the residual liquor of a wood pulping process.

In the operation of the apparatus described, concentrated liquor is burned within the furnace 10 with substantially all of the inorganic chemicals discharged through the spout 12 in the form of a molten smelt. The heat of combustion generated in the furnace is utilized in the vapor generator, and the air heater 16, with the low potential heat introduced with the flue gases into the cyclone evaporator 20. The liquor is finally concentrated by evaporation within the evaporator and passed through the mixing tank to the nozzle 44 in the furnace wall. In accordance with the present invention, the solid particles suspended in the concentrated liquor are subjected to the crushing or disintegrating action of revolving blades passing between stationary plates so that the liquor delivered to the furnace is substantially free from oversized lumps of solid materials.

It will be noted that the present invention provides apparatus for eliminating lumps of solids in the liquor so as to avoid pluggage of nozzle orifices or connecting piping. This is accomplished while retaining the solids in the liquor. The crushing apparatus is arranged to apply concentrated forces to the oversized solids in the liquor without interrupting the flow of liquids through the apparatus. It will also be noted that the normal liquor level in the flow box 50 is below the axis of rotation of the shaft 53. Thus, the disintegrator or crushing means of the present invention is at least partially submerged in the liquor stream. However, the unit is capable of effective operation even though the liquor level rises above the axis of blade rotation. With such a raised liquor level larger particles of solids might pass through the apparatus, i. e. between adjacent blades above the vertical extent of the plates 57. Nevertheless the rotation of the blades 60 will tend to force some of the larger particles downwardly, to be engaged between the plates 57 and blades 60 for size reduction.

While in accordance with the provisions of the statutes we have illustrated and described herein the best form of the invention now known to us, those skilled in the art will understand that changes may be made in the form of the apparatus disclosed without departing from the spirit of the invention covered by our claim, and that certain features of our invention may sometimes be used to advantage without a corresponding use of other features.

We claim:

The combination comprising walls defining a furnace for the spray incineration of a pulp residual liquor, liquor spray nozzle means positioned in a wall of said furnace, evaporator means for concentrating said liquor prior to its incineration by direct contact with combustion gas resulting from the incineration of concentrated liquor in said furnace, a mixing tank, pump means connecting said mixing tank with said nozzle means, a flow box connecting said evaporator and mixing tank for the gravitational flow of concentrated liquor to said mixing tank, a plurality of stationary plates transversely spaced in a row across the bottom of said flow box in the path of liquor flow, and a plurality of power driven rotary blades positioned to pass through the openings between said stationary plates to crush and thereby limit the individual size of solids in the liquor delivered to said spray nozzle means.

References Cited in the file of this patent

UNITED STATES PATENTS

| | | |
|---|---|---|
| 1,242,986 | Sawyer | Oct. 16, 1917 |
| 1,794,006 | Falla | Feb. 24, 1931 |
| 1,933,254 | Goodell | Oct. 31, 1933 |
| 2,023,031 | Rohrer | Dec. 3, 1935 |
| 2,303,811 | Badenhausen | Dec. 1, 1942 |
| 2,421,066 | Howe | May 27, 1947 |
| 2,428,420 | Green | Oct. 7, 1947 |
| 2,464,588 | Knudsen et al. | Mar. 15, 1949 |
| 2,495,248 | Gagliardi et al. | Jan. 24, 1950 |
| 2,496,017 | Newell et al. | Jan. 31, 1950 |
| 2,524,753 | Betts | Oct. 10, 1950 |
| 2,593,503 | Tomlinson et al. | Apr. 22, 1952 |

FOREIGN PATENTS

| | | |
|---|---|---|
| 698,125 | Germany | Nov. 1, 1940 |